United States Patent
Mangal et al.

(10) Patent No.: US 7,242,944 B1
(45) Date of Patent: Jul. 10, 2007

(54) METHOD AND SYSTEM FOR DYNAMICALLY RE-HOMING A BASE TRANSCEIVER STATION

(75) Inventors: Manish Mangal, Overland Park, KS (US); Fred Rogers, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 350 days.

(21) Appl. No.: 10/627,388

(22) Filed: Jul. 25, 2003

(51) Int. Cl.
*H04Q 7/34* (2006.01)

(52) U.S. Cl. .............. 455/445; 455/422.1; 455/423; 455/424; 455/67.14; 455/403; 455/560; 455/453; 718/100; 718/104; 370/247; 370/248

(58) Field of Classification Search .............. 455/403, 455/422.1, 426.1, 426.2, 450, 451, 452.1, 455/452.2, 453, 500, 517, 509, 514, 550.1, 455/560, 445, 423, 424, 425, 67.11, 67.14; 718/100, 104, 105; 370/247, 248
See application file for complete search history.

(56) References Cited

U.S. PATENT DOCUMENTS

2002/0072380 A1* 6/2002 Takashima et al. ......... 455/461
2003/0119512 A1* 6/2003 Nakashima ................. 455/439
2003/0190915 A1* 10/2003 Rinne et al. ................ 455/436
2004/0244001 A1* 12/2004 Haller et al. ............... 718/100
2006/0003775 A1* 1/2006 Bull et al. ............... 455/456.1

FOREIGN PATENT DOCUMENTS

WO        WO99/52314         * 10/1999

OTHER PUBLICATIONS

"AT&T Wireless and Sprint to Cooperate in the Construction of New Wireless Towers", Redmond, Wash. & Overland Park, Kan. —(Business Wire)—Jan. 28, 2003.

* cited by examiner

*Primary Examiner*—Keith Ferguson

(57) ABSTRACT

The method and system provides for receiving at a local base transceiver station a wireless signal and for routing that signal from the local base transceiver station to a remote base station controller. In exemplary embodiments, control logic stored in local components of a wireless telecommunications network can select one of multiple remote base station controllers to which to route the signal. Further, local telecommunications components can make these selections based on the occurrence of various triggering events, such as the occurrence of a particular time/day/date, or such as the involvement of a particular client station, or the signal having a particular form or content.

19 Claims, 3 Drawing Sheets

METHOD AND SYSTEM FOR DYNAMICALLY RE-HOMING A BASE TRANSCEIVER STATION

BACKGROUND

1. Field of the Invention

The present invention relates to wireless communications and more particularly to allocation of call processing resources in a wireless communications network.

2. Description of the Related Art

In a typical cellular radio communications system ("wireless telecommunications network"), an area is divided geographically into a number of cell sites, each defined by a radio frequency ("RF") radiation pattern from a respective base transceiver station ("BTS") antenna. The base station antennae in the cells are in turn coupled to a base station controller ("BSC"), which is then coupled to a telecommunications switch or gateway, such as a mobile switching center ("MSC") or packet data serving node ("PDSN") for instance. The switch or gateway may then be coupled to a telecommunications network such as the public switched telephone network ("PSTN") or the Internet.

When a client station (such as a cellular telephone, pager, or appropriately equipped portable computer, for instance) is positioned in a cell, the client station communicates via an RF air interface with the BTS antenna of the cell. Consequently, a communication path is established between the client station and the telecommunications network, via the air interface, the BTS, the BSC, and the switch or gateway.

As its name suggests, a BSC functions to control communications via a BTS. For instance, in some arrangements, a BSC may control the power level of signals emitted wirelessly by a BTS and may control handoff of communications as a client station moves between sectors within a BTS coverage area.

SUMMARY

An exemplary embodiment of the present invention provides for dynamically re-homing a BTS between a plurality of BSCs.

By default, a typical BTS will be arranged to pass client station communications to a particular BSC. That is, a BTS will receive signaling and/or bearer traffic wirelessly from a client station and will be set to pass that traffic to a particular BSC.

In accordance with the exemplary embodiment, however, the BTS will have connections with a plurality of BSCs. The connections can take various forms, such as direct T1 links and/or packet-switched network links, for instance. When the BTS wirelessly receives traffic from a client station, the BTS (or another component of the wireless telecommunications network) will then decide which BSC should receive the traffic and will route the traffic to that BSC.

For instance, a BTS might be coupled by a T1 line with a local BSC and might also be coupled with a packet-switched network that provides connectivity with multiple remote BSCs, each at a respective IP address. Each remote BSC could reside in a distant serving system, such as in another state, for instance.

The BTS might then maintain a set of logic that indicates which BSC to use in a given instance, such as in response to the occurrence of various triggering events, such as the occurrence of a particular time/day/date, or such as the involvement of a particular client station, or the traffic having a particular form or content (e.g., calling or called number, signaling, or bearer, etc.) For example, the BTS logic might indicate that traffic from a particular client station should be routed via the packet-switched network to a particular remote BSC, whereas traffic from another client station should be routed over the T1 line to the local BSC.

The exemplary embodiment can be used to facilitate testing of cellular network equipment. For instance, a carrier (for instance, a telecommunications provider) might change the hardware and/or software configuration of a local BTS and/or of various remote BSCs and/or MSCs, and the carrier might want to verify that the system will still operate as desired. To do so, the carrier may direct that test traffic through the local BTS be routed to a given remote BSC and may test operation of the system (the BTS, with that remote BSC/MSC) in that configuration, and the carrier may then direct that other test traffic through the local BTS be routed through another remote BSC and may test operation of the system (the BTS, with that other remote BSC/MSC) in that configuration.

Advantageously, the carrier could perform this sort of testing with a BTS that also serves actual subscribers. To do so, the carrier might direct the BTS to route over the packet network to a given remote BSC only traffic originating from a designated client station, and the carrier might direct the BTS to route all other traffic via the T1 line to a local BSC.

Other examples are possible as well.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Architecture

Figure 1:
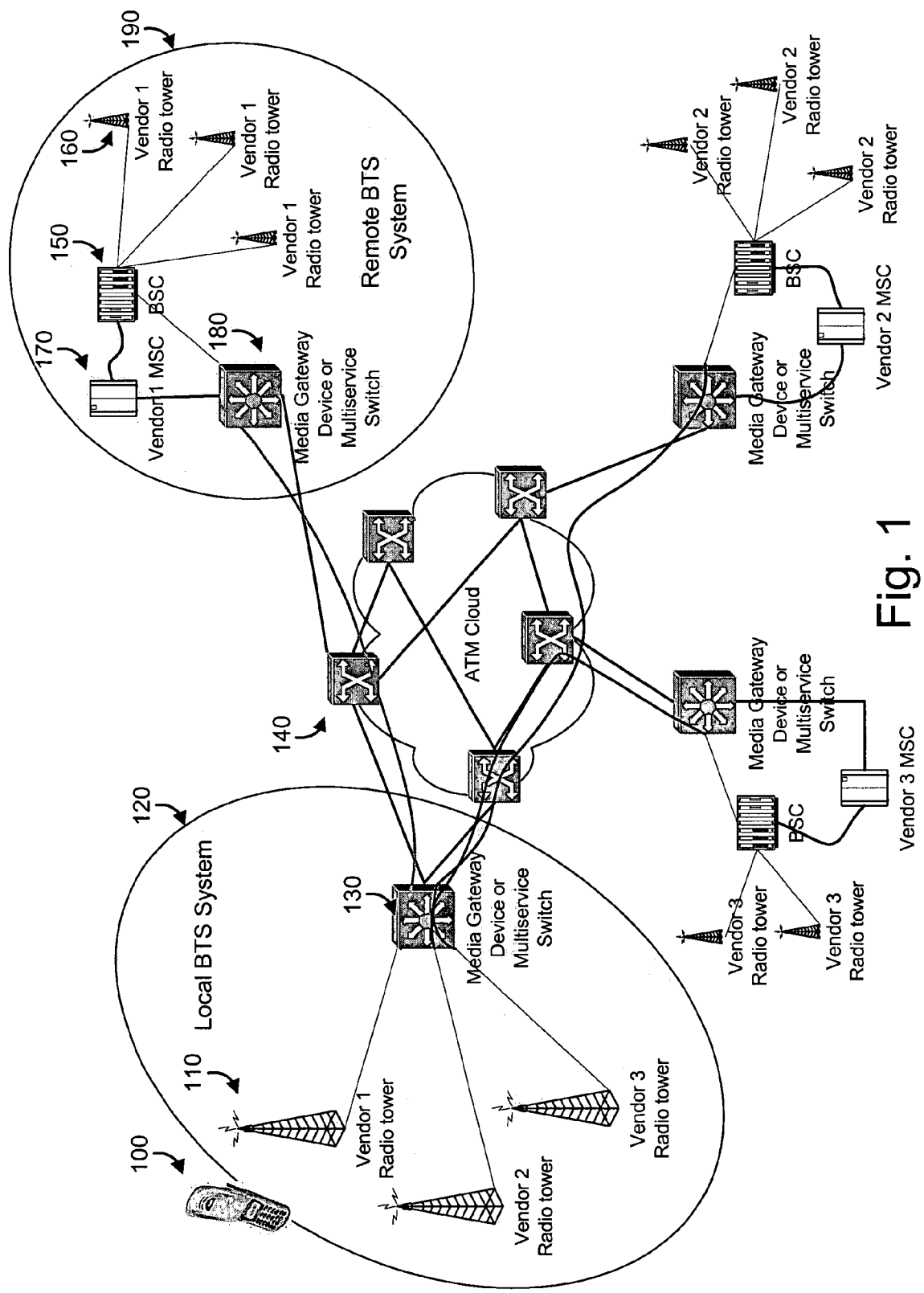
FIG. 1 is a block diagram of an exemplary architecture in accordance with an exemplary embodiment.

FIG. 1 shows a portion of a wireless telecommunications network comprising an exemplary architecture for facilitating communication between a client station 100; a local BTS system 120; and a plurality of remote BTS systems, such as remote BTS system 190. For any number of reasons, a carrier might want to test the operation or configuration of the hardware and/or software of a remote BTS system. As one example, a BTS vendor might upgrade equipment or software in a remote BTS system, and a carrier might then test the operation of the remote BTS system after the change. In an exemplary embodiment, the carrier can test the operation of a remote BTS system using the local BTS system 120. For example, the local BTS system 120 might comprise functionality and/or hardware to facilitate testing of the remote BTS system.

FIG. 1 depicts the local BTS system 120 as comprising multiple local BTSs, including local BTS 110. Each of the local BTSs, including local BTS 110, might correspond to a vendor of BTSs. Likewise, each remote BTS system, including remote BTS system 190, might also correspond to a vendor of BTSs. Further, each one of the remote BTS systems might correspond to a different geographic region comprising a market for a particular vendor of BTSs. By way of example, as depicted in FIG. 1, local BTS 110 and remote BTS system 190 might both correspond to vendor 1. In an exemplary embodiment, the carrier might then test the configuration of a vendor-specific remote BTS system (for instance, the remote BTS system 190 that corresponds to vendor 1) using the local BTS that corresponds to that vendor (for instance, the local BTS 110 that corresponds to vendor 1).

It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware, and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

As shown in FIG. 1, the client station 100 can communicate with the local BTS 110 that might be part of the local BTS system 120. In the exemplary embodiment of FIG. 1, the client station 100 might communicate with the local BTS 110 using any of a variety of different protocols. For instance, the client station 100 might communicate with the local BTS 110 using Code Division Multiple Access ("CDMA"). CDMA provides a method for sending wireless signals between the client station 100 and the local BTS 110. In a CDMA system, the local BTS 110 communicates with the client station 100 over a spread spectrum of frequencies. Typical components for CDMA systems include those described in the Telecommunications Industry Association ("TIA") standard, ANSI/TIA/EIA-95-B-99, dated Feb. 3, 1999, which is incorporated herein by reference in its entirety. Time Division Multiple Access ("TDMA") is another popular method for wireless communications. In TDMA systems, the local BTS 110 typically communicates on a group of frequencies, and each frequency may itself carry at least one multiplexed call. The Global System for Mobile Communications ("GSM") or another method may also be used.

Local BTS 110 might comprise components, such as an antenna system, that can wirelessly receive signals from the client station 100 and that can forward the received signals to other local components of the telecommunications network ("local telecommunications components"). The configuration of the local BTS and its associated components might depend on the preferences of that particular vendor of BTSs. As depicted in the exemplary embodiment of FIG. 1, the local telecommunication components of the local BTS system might comprise a local gateway device 130. The local gateway device 130, in turn, might be a media gateway device or a multiservice switch, for example. And although not shown in the exemplary embodiment of FIG. 1, the local telecommunications components might also include one or more BSCs and/or MSCs, which might be connected to one or more local BTSs. And any one of the local telecommunications components might be configured to receive the wireless signal from the local BTS 110. For example, one of the local telecommunications components might include control logic that might be configured to receive the wireless signal from the local BTS 110.

As depicted in FIG. 1, in an exemplary embodiment, a local telecommunications component can receive the signal from the local BTS 110 and route the signal to other telecommunications components, which might, in turn be remote components in the telecommunications network ("remote telecommunications components"). In an exemplary embodiment, the local gateway device 130 might receive the signal from the local BTS 110 and then route the signal to a remote telecommunications component.

In an exemplary embodiment, the local gateway device 130 might also connect the local BTS system 120 to a packet-switched or packet-infrastructure network. Although any packet-switched or packet-infrastructure network is contemplated, examples include Asynchronous Transfer Mode ("ATM"), Internet Protocol ("IP"), or Synchronous Optical NETwork ("SONET") networks, for instance. The exemplary embodiment depicted in FIG. 1 comprises an ATM network 140. The ATM network 140 might be based on the ATM protocol, which is a protocol that can, for example, merge voice signals (from a telecommunications network, for instance) and data. The local gateway device 130 might then, for example, convert voice data to packets for transmission over the ATM network 140.

In an exemplary embodiment, the client station 100 might transmit the wireless signal as a TDM (time division multiplex) signal. In an exemplary embodiment, the local gateway device 130 might then receive the signal from the local BTS 110 as a TDM signal. The local gateway device 130 might then convert ("packetize") the TDM signal to packet form for use in a packet-switched network. The local gateway device 130 might packetize the signal such that the signal is compatible with various packet-switched network protocols, such as ATM protocol, IP, SONET protocol, or any other type of packet-switched network protocol.

In the exemplary embodiment depicted in FIG. 1, a plurality of remote BTS systems, including the exemplary remote BTS system 190, might be connected to the ATM network 140. Each of the remote BTS systems connected to the ATM network 140 might comprise a remote telecommunications component, such as a remote gateway device 180, a remote BSC 150, or a remote MSC 170, which might connect the remote BTS system 190 to the ATM network 140. In the exemplary embodiment depicted in FIG. 1, the remote gateway device 180 can connect the remote BTS system 190 to the ATM network 140. In such a case, the remote BSC 150 is the one, particular BSC connected to the remote gateway device 180 in the remote BTS system 190. Each remote BTS system might also comprise one or more BTSs, such as the remote BTS 160 of the remote BTS system 190.

In an exemplary embodiment, a local telecommunications component can be configured to route signals to remote BSCs in remote BTS systems by routing signals to the remote telecommunications component that connects that remote BTS system to the packet-switched network. For example, a local telecommunications component can route a signal to a remote telecommunications component by packetizing the signal and adding to each packet header a destination address that corresponds to the network address of the remote telecommunications component. In the exemplary embodiment of FIG. 1, the local gateway device 130 can route a signal to the remote gateway device 180 by packetizing the signal and adding to each packet header a destination address that corresponds to the network address of the remote gateway device 180. The local gateway device 130 might also add the network address of the local gateway device 130 that is the source of the packet.

In an exemplary embodiment, the local gateway device 130 might use several different protocols to convert voice or TDM (time division multiplexing) signals into data packets, to consolidate voice and data, and/or to transmit the data packets over the packet switched network. For example, ITU recommendation G.711 defines a protocol for encoding uncompressed speech by sampling a voice channel. The local gateway device 130 might use other protocols, such as ITU G.723.1, to compress speech. Still other protocols for encoding voice signals might include ITU G.726, G.729, G.728, and any other protocols that would be developed in the future.

Further, the local gateway device 130 might use additional protocols to negotiate call control and call signaling with a remote telecommunications component, such as the remote gateway device 180. For example, the gateways might use ITU H.245 to agree on a common compression algorithm to use when transmitting the speech. As another example, the gateways might use ITU Q.931 to transmit standard telephony signals such as dial tones and ringing sounds to the remote gateway device 180. Further, the gateways might also use ANSI-41 wireless network signaling protocol.

The local gateway device 130 might then use another protocol, for example, RTP, for transmission of the actual data. For instance, using RTP, the local gateway device 130 might send a sequence of RTP packets representing data content to the remote gateway device 180. When the remote gateway device 180 receives the incoming RTP packets from the local gateway device 130, logic stored in the data storage of the remote gateway device 180 might depacketize the packets and decode the encapsulated data. Other protocols, such as UDP and/or TCP, might be used as well.

As depicted in FIG. 1, the remote telecommunications component, for example, the remote gateway device 180, can receive the packets from the local telecommunications component, for example, the local gateway device 130, and can read the source IP address for each packet from the packet header. In an exemplary embodiment, based on the source IP address, the remote telecommunications component can determine that a specific packet is a test packet. The remote telecommunications component can then send the packet to a specific portion or port of a remote BSC, such as remote BSC 150, for example, and in an exemplary embodiment, all test packets can go to that port.

2. Exemplary Operation

Figure 2:
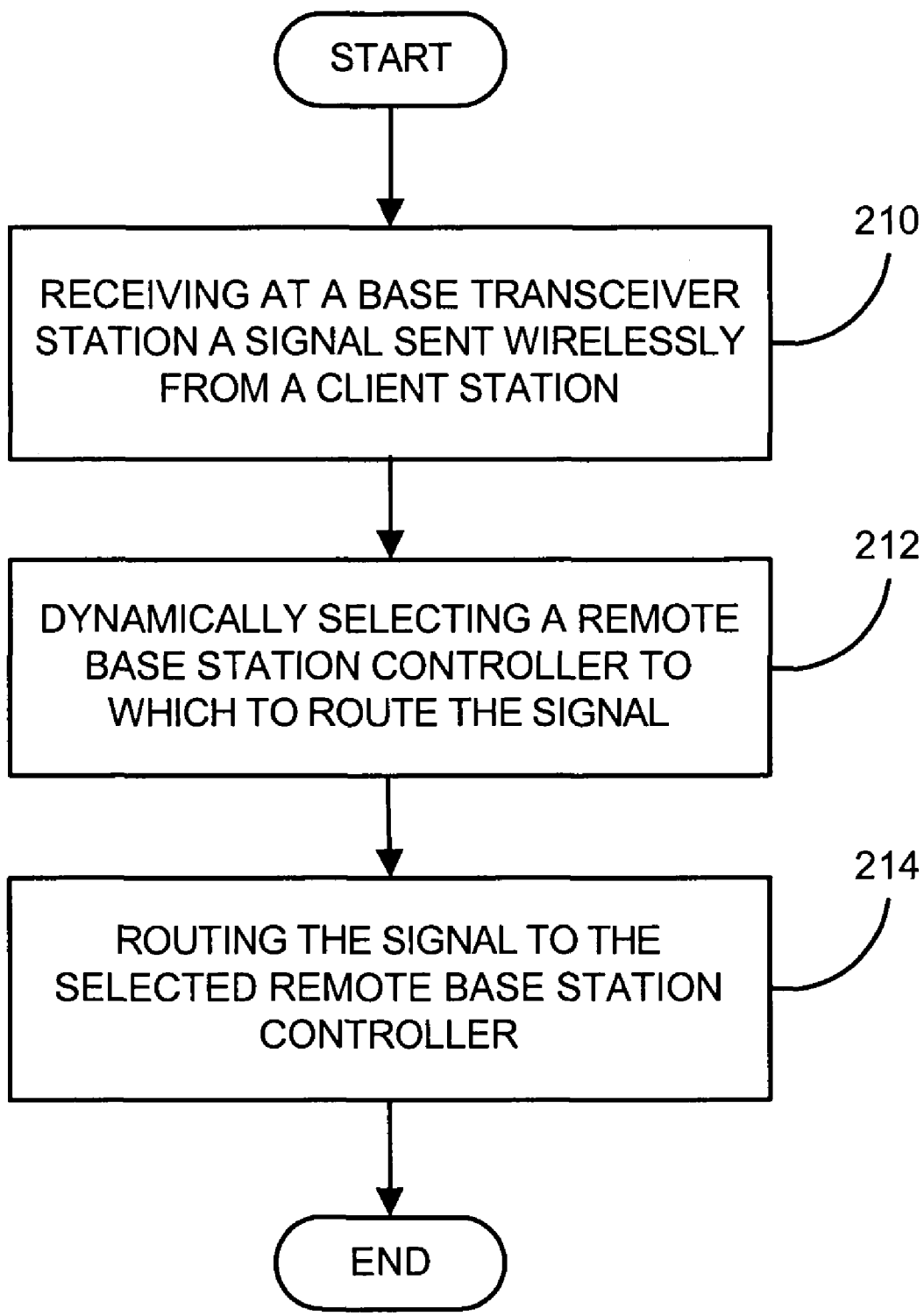
FIG. 2 is a flowchart illustrating a process carried out by a system in accordance with an exemplary embodiment.
Figure 3:
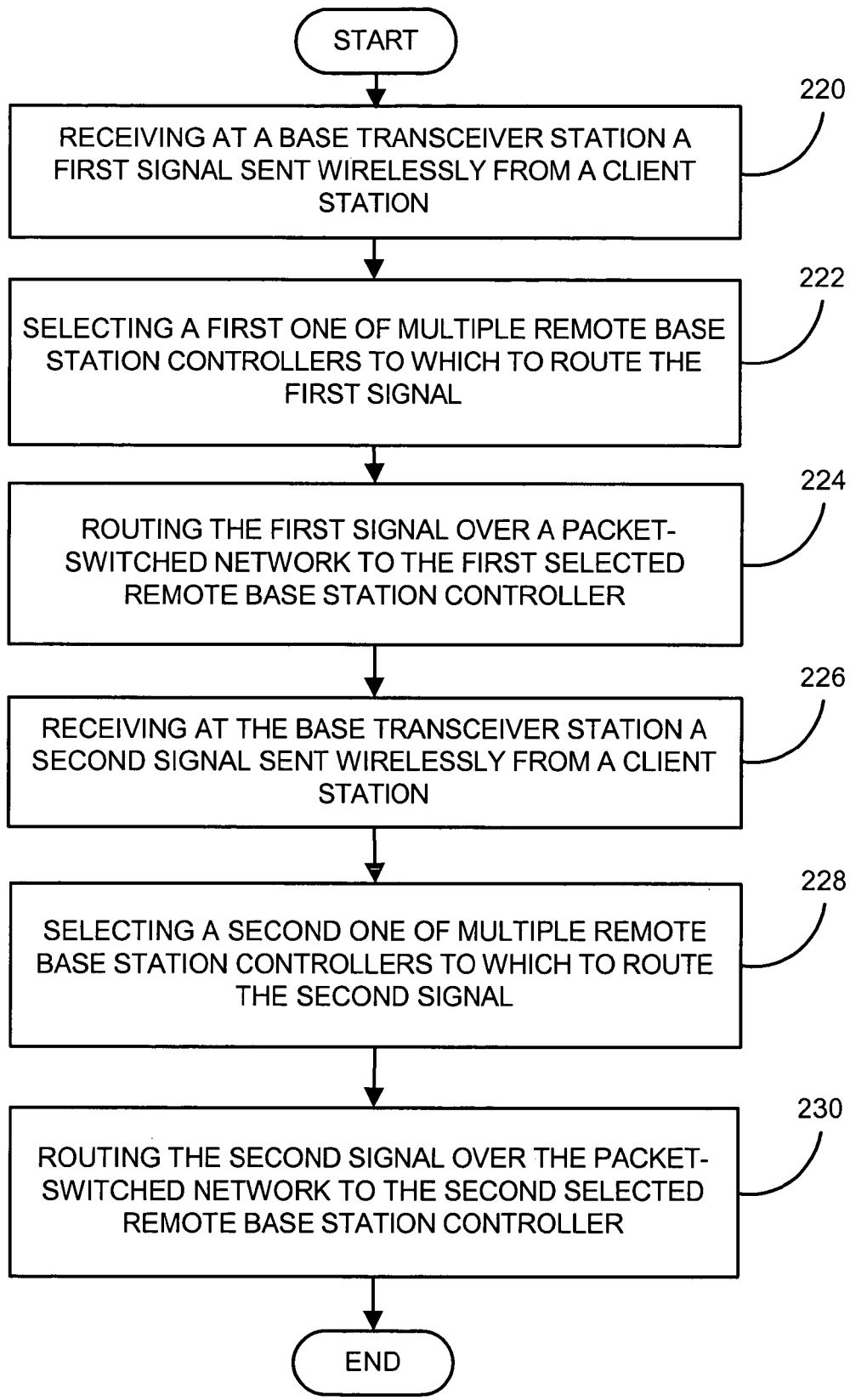
FIG. 3 is a flowchart illustrating a process carried out by a system in accordance with an exemplary embodiment.

FIGS. 2 and 3 are flowcharts that depict functions that might be involved in a local BTS receiving a wireless signal from a client station, a local telecommunications component selecting a remote telecommunications component to which to route the wireless signal, and the local telecommunications component routing the wireless signal to that remote component. The functions depicted in FIGS. 2 and 3 might be performed by hardware such as depicted in FIG. 1.

a. Exemplary Static Embodiment

In an exemplary static embodiment, a local BTS 110 might receive a telecommunications signal sent wirelessly from a client station 100. The signal from the client station 100 might be, for example, a wireless TDM signal, and the wireless signal might comprise voice signals and/or data signals. In any case, upon receipt of the signal, the local BTS 110 might then forward the signal to other, local telecommunications components, such as a local gateway device 130, a local BSC (not shown in FIG. 1), or a local MSC (not shown in FIG. 1), which might be configured to receive the signal from the local BTS 110.

The local telecommunications component receiving the signal, such as local gateway device 130, might also be configured to route the signal to another, remote component in the telecommunications network. And the local telecommunications component might be configured such that it statically routes the signal, and any number of other signals that it receives (either from the particular local BTS 110 or any and/or all local BTSs) to particular remote telecommunications components.

For instance, the local telecommunications component might statically route all signals it receives from a particular BTS, such as the local BTS 110, to a particular remote telecommunications component, such as the remote BSC 150, the remote MSC 170, or the remote gateway device 180. In an exemplary embodiment, the local telecommunications component might also be connected to a plurality of BTSs, and for each of at least some of those BTSs, the local telecommunications component might be configured to statically route signals to particular remote telecommunications components.

In any case, in the exemplary static embodiment, the local telecommunications component, for example, the local gateway device 130, might route the telecommunications signal over a packet switched network. To do so, the local telecommunications component might packetize the signal for transmission, and as part of each packet, might include a destination address. The local telecommunications component can then route the signal by including in each packet the address of the destination telecommunications component. For example, the local gateway device 130 might route a signal to the remote gateway device 180 by packetizing the signal and including in each packet the IP address of the remote gateway device 180 as the destination address. The local gateway device 130 might then transmit each packet over a packet switched network, such as ATM network 140, to the remote gateway device 180. The remote gateway device 180 might then transmit the signal to the particular remote BSC, such as remote BSC 150, to which it is connected. Other examples are possible as well.

b. First Exemplary Dynamic Embodiment

At block 210 of FIG. 2, a local BTS 110 might receive a telecommunications signal sent wirelessly from a client station 100. The signal from the client station might be, for example, a wireless TDM signal, and the wireless signal might comprise voice signals and/or data signals. The wireless signal might further comprise information identifying attributes of particular calls (or signals) originating from the client station, as well as information identifying attributes and/or functionality of the client station itself (collectively, "identification information"). The identification information might include the time, day, or date on which the call or signal originated; an ESN (electronic serial number) of the client station 100, which might have been programmed into the client station 100 when it was manufactured; an MIN (mobile identification number) of the client station 100, which might have been programmed into the client station 100 upon purchase; and/or an SID (system identification code) or a verification of a SID, which might correspond with a particular carrier and which might have been programmed into the client station 100 upon purchase. Other examples are possible as well. In any case, upon receipt of the signal, the local BTS 110 might then forward the signal to other, local telecommunications components, such as a local gateway device 130, a local BSC (not shown in FIG. 1), or a local MSC (not shown in FIG. 1), which might be configured to receive the signal from the local BTS 110.

At block 212, the local telecommunications component receiving the signal, such as the local gateway device 130, might also be configured to select one of multiple remote telecommunications components to which to route the signal from the local BTS 110. For example, the local telecommunications component might be configured to select a remote telecommunications component in one of a plurality of remote BTS systems. And the local telecommunications component might be configured such that it dynamically selects a particular remote telecommunications component to which to route the signal, and any number of other signals that it receives (either from the particular local BTS 110 or any and/or all local BTSs). In an exemplary embodiment, the selection might be controlled by logic that might be stored in the local telecommunications component.

In the exemplary dynamic embodiment, the local telecommunications component, such as the local gateway device 130, can differentiate between calls and/or between client stations and, in response to that differentiation, route the associated signal. In such as way, the local telecommunications component might dynamically select a remote telecommunications component to which to route the signal. Further, the local telecommunications component might dynamically select the remote telecommunications component based on identification information associated with the signal and/or the originating client station.

Expanding upon the dynamic routing example, in an exemplary embodiment, the local telecommunications component, such as the local gateway device 130, can be configured to differentiate between calls from the local BTS 110 based on, for example, the MIN of the client station from which the call originated. In such a case, the client station might transmit a MIN as part of its wireless signal, and the local gateway device 130 might then receive the MIN as part of the transmitted signal. In an exemplary embodiment, the local gateway device 130 might identify the MIN and differentiate the signal from other signals based on the MIN.

As one example, the local gateway device 130 might differentiate the signal by comparing the received MIN with known MINs. In an exemplary embodiment, the local gateway device 130 might communicate with one or more databases. The known MINs might be stored in a database, for example, and the known MINs might comprise a list of MINs that might be used for testing, for example. In an exemplary embodiment, the local gateway device 130 might then compare the received MIN with the list of MINs. If the received MIN matches a particular known MIN, the local gateway device 130 might be configured to select a particular remote BTS system to which to route the signal. Further, the local gateway device 130 might also be configured to obtain the network address of a remote telecommunications component in the particular remote BTS system.

At block 214, the local telecommunications component receiving the signal, such as the local gateway device 130, might route the signal to another, remote telecommunications component, such as remote gateway device 180. And in an exemplary embodiment, the local gateway device 130 might route the signal over a packet switched network, such as ATM network 140. As discussed above, to do so, the local gateway device 130 might packetize the signal for transmission, and as part of each packet, might include as the destination address the network address of the remote gateway device 180. The local gateway device 130 might then transmit each packet over the ATM network 140 to the remote gateway device 180. Other examples are possible as well.

In an exemplary embodiment, the remote gateway device 180 can then depacketize the wireless signal and convert the signal back to the TDM signal. The remote gateway device 180 might then send the signaling message component of the wireless signal to another remote telecommunications component, such as the remote BSC 150. Normal call processing might then occur—the remote gateway device 180 might send the call to the remote BSC 150, and the remote BSC 150 might then review the signaling message, determine the actual termination of the call, and send the call to the remote MSC 170 for further processing. Other call handling procedures are possible as well.

c. Second Exemplary Dynamic Embodiment

FIG. 3 depicts an expanded set of functions that might be performed by an exemplary embodiment in which more than one signal is received by a local telecommunications component. As discussed above with respect to FIG. 2, at block 220 of FIG. 3, a local BTS 110 might receive a first telecommunications signal sent wirelessly from a client station 100. At block 222 of FIG. 3, a local telecommunications component might then select one of multiple remote telecommunications components to which to route the first signal. And at block 224 of FIG. 3, the local telecommunications component might then route the first signal to the selected remote telecommunications component over a packet-switched network.

At block 226 of FIG. 3, the local BTS 110 might receive a second telecommunications signal sent wirelessly from a client station, such as client station 100 or another client station. Upon receipt of the second signal, the local BTS 110 might then forward the second signal to the local telecommunications component that received the first signal, for example, the local gateway device 130. The local telecommunications component might, in turn, be configured to receive both the first and second signals (or any number of signals) from the local BTS 110 and/or other BTSs.

At block 228, the local telecommunications component receiving the second signal, such as the local gateway device 130, might also be configured to select one of a plurality of remote telecommunications components to which to route the second signal. Further, the local telecommunications component might dynamically select the remote telecommunications component based on identification information associated with the second signal and/or the client station from which the second signal originated.

At block 230, the local telecommunications component might then route the second signal to the selected remote telecommunications component over the packet switched network. And that selected remote telecommunications component might then transmit that signal to a remote BSC.

d. Exemplary Dynamic Operation

In an exemplary embodiment that might incorporate the functionality of blocks 220–230 of FIG. 3, the local telecommunications component, for example, local gateway device 130, might be configured to differentiate between received telecommunications signals. For instance, the local gateway device 130 might differentiate between test signals (signals intended for use in testing remote BTS systems, for example) and non-test signals (customer-generated signals, for example).

Thus, the local gateway device 130 might receive from one or more local BTSs multiple signals. For each signal received, the local gateway device 130 might use the identification information of the signal to identify whether the signal is a test signal or a non-test signal. Based on this determination, the local gateway device 130 might then select from multiple remote BTS systems a remote BTS system to which to route the signal. In the case of a test signal, the local gateway device 130 might route the signal to a remote BTS system undergoing testing. In the case of a non-test signal, the local gateway device 130 might route the signal according to established call routing procedures. Other examples are possible as well. Further, the local gateway device 130 might route the signals to the remote gateway device 180 via a packet-switched network or via a direct link between the components.

The local telecommunications component might likewise receive any number of additional calls or signals and process each accordingly.

3. Conclusion

Several exemplary embodiments of the present invention have been described above. Those skilled in the art will understand, however, that changes and modifications may be made to these embodiments without departing from the true scope and spirit of the present invention, which is defined by the claims.

We claim:

1. A method of allocating call processing resources comprising:
    receiving at a base transceiver station a signal sent wirelessly from a client station;
    selecting one of multiple base station controllers to which to route the signal from the base transceiver station, wherein the base station controller is selected based upon a characteristic of the signal that identifies that the signal is a test signal; and
    routing the signal from the base transceiver station to the selected base station controller.

2. The method of claim 1, wherein selecting the one base station controller to which to route the signal comprises selecting the one base station controller based at least in part on a current time and/or day and/or date.

3. The method of claim 1, wherein selecting the one base station controller to which to route the signal comprises:
    detecting that the signal originated from a particular client station; and
    selecting the one base station controller based at least in part on the signal having originated from the particular client station.

4. The method of claim 1, further comprising:
    detecting particular content of the signal; and
    responsively selecting one controller based at least in part on the particular content of the signal.

5. The method of claim 4, wherein the particular content comprises dialed digits.

6. The method of claim 4, wherein the particular content comprises an identification of the client station.

7. The method of claim 1, wherein routing the signal from the base transceiver station to the selected base station controller comprises:
    sending the signal into a packet-switched network for transmission over the packet-switched network to the selected base station controller.

8. The method of claim 1, wherein routing the signal from the base transceiver station to the selected base station controller comprises:
    sending the signal over a direct link between the base transceiver station and the selected base station controller.

9. A method comprising:
    receiving at a base transceiver station a first signal sent wirelessly from a client station;
    selecting a first one of multiple base station controllers to which to route the first signal from the base transceiver station, wherein the first base station controller is selected based upon a characteristic of the first signal, and routing the first signal over a packet-switched network from the base transceiver station to the first selected base station controller;
    receiving at the base transceiver station a second signal sent wirelessly from a client station; and
    selecting a second one of multiple base station controllers to which to route the second signal from the base transceiver station, wherein the second base station controller is selected based upon a characteristic of the second signal that identifies that the signal is a test signal, and routing the second signal over the packet-switched network from the base transceiver station to the second selected base station controller.

10. A base transceiver station comprising:
    an antenna system configured to wirelessly receive signals from client stations; and
    control logic tied locally to the antenna system, wherein the antenna system passes to the control logic the signals that the antenna system receives wirelessly from client stations, and wherein the control logic in turn passes the signals to a remote base station controller,
    wherein the control logic is arranged to select one of multiple remote base station controllers to which to route a given signal received by the antenna system, and to then route the given signal to the selected remote base station controller, wherein the remote base station controller is selected based upon a characteristic of the signal that identifies that the signal is a test signal.

11. The base transceiver station of claim 10, wherein the control logic comprises a processor, data storage, and machine language instructions stored in the data storage and executable by the processor to select the one remote base station controller.

12. The base transceiver station of claim 10, wherein the control logic selects the one remote base station controller based at least in part on a time and/or day and/or date when the control logic receives the given signal.

13. The base transceiver station of claim 10, wherein the control logic selects the one remote base station controller by a process comprising:
    detecting that the given signal originated from a particular client station; and
    selecting the one remote base station controller based at least in part on the signal having originated from the particular client station.

14. The base transceiver station of claim 10, wherein the control logic selects the one remote base station controller by a process comprising:
    detecting particular content of the signal; and
    responsively selecting the one remote base station controller based at least in part on the particular content of the signal.

15. The base transceiver station of claim 14, wherein the particular content comprises dialed digits.

16. The base transceiver station of claim 14, wherein the particular content comprises an identification of the client station.

17. The base transceiver station of claim 10, wherein the control logic routes the given signal to the selected one remote base station controller by sending the signal into a packet-switched network for transmission over the packet-switched network to the selected one remote base station controller.

18. The base transceiver station of claim 10, wherein the control logic routes the given signal to the selected one remote base station controller by sending the signal over a direct link between the base transceiver station and the selected remote base station controller.

19. A base transceiver station comprising:
an antenna system configured to wirelessly receive signals from client stations; and
control logic tied locally to the antenna system, wherein the antenna system passes to the control logic the signals that the antenna system receives wirelessly from client stations, and wherein the control logic in turn passes the signals to a remote base station controller,
wherein the control logic selects a first one of multiple remote base station controllers to which to route a first signal received by the antenna system, and the control logic then routes the first signal to the selected first remote base station controller, wherein the first remote base station controller is selected based upon a characteristic of the first signal, and
wherein the control logic selects a second one of the multiple remote base station controllers to which to route a second signal received by the antenna system, and the control logic then routes the second signal to the selected second remote base station controller, wherein the second remote base station controller is selected based upon a characteristic of the second signal that identifies that the signal is a test signal.

* * * * *